United States Patent
Dumont et al.

(10) Patent No.: US 11,026,401 B2
(45) Date of Patent: Jun. 8, 2021

(54) TOOL FOR MARKING LIVESTOCK

(71) Applicants: Bertrand Dumont, Portsmouth, RI (US); Leocadio Luis Villarreal Lozano, Nuevo Leon (MX)

(72) Inventors: Bertrand Dumont, Portsmouth, RI (US); Leocadio Luis Villarreal Lozano, Nuevo Leon (MX)

(73) Assignee: Cotran Corporation, Portsmouth, RI (US)

( * ) Notice: Subject to any disclaimer, the term of this patent is extended or adjusted under 35 U.S.C. 154(b) by 183 days.

(21) Appl. No.: 16/459,471

(22) Filed: Jul. 1, 2019

(65) Prior Publication Data
US 2021/0000074 A1     Jan. 7, 2021

(51) Int. Cl.
    *A01K 11/00*      (2006.01)
    *B43K 23/08*      (2006.01)

(52) U.S. Cl.
    CPC .......... *A01K 11/005* (2013.01); *B43K 23/08* (2013.01)

(58) Field of Classification Search
CPC .. A01K 11/005; A01K 11/006; A01K 11/007; A01K 11/00; B43K 23/08; B43K 23/016; B43K 27/00; B43K 31/00; B43K 19/00; B43K 19/06; B43K 19/14; B43K 19/145; A61M 37/0076; C09D 13/00; C09D 17/004; C09D 17/003
See application file for complete search history.

(56) References Cited

U.S. PATENT DOCUMENTS

| | | | | |
|---|---|---|---|---|
| 2,870,740 | A * | 1/1959 | Vogt | B43K 23/016 401/34 |
| 6,357,944 | B1 * | 3/2002 | Reed | B43K 23/00 401/88 |
| 2004/0071491 | A1 * | 4/2004 | Hetzel | B43K 19/14 401/96 |
| 2014/0270890 | A1 * | 9/2014 | Whigham | B43K 24/00 401/57 |
| 2019/0092085 | A1 * | 3/2019 | Michel Bodie | A45D 40/205 |
| 2019/0118572 | A1 * | 4/2019 | Landers | B43K 23/016 |

* cited by examiner

*Primary Examiner* — Jocelin C Tanner
(74) *Attorney, Agent, or Firm* — Keeley DeAngelo LLP; W. Scott Keeley

(57) ABSTRACT

A tool for marking livestock is a cylinder of marking material enveloped by a sheathing. The sheathing is segmented annularly at intervals along the vertical axis and each segment and is cut vertically so that it can be removed in sections to gradually reveal more of the marker.

7 Claims, 7 Drawing Sheets

100

TOOL FOR MARKING LIVESTOCK

TECHNICAL FIELD

The invention relates in general to non-propelling pencils, styles, crayons and chalks; and more particularly to those with paper sheaths.

BACKGROUND

Livestock-marking instruments are used in the veterinary arts to mark animals in various stages of care; for example an animal may be marked according to size or breed before being sent to market, or marked after vaccination.

Livestock markers can work like grease pens or paint sticks. The mark is created by physical abrasion, leaving material on the intended surface. In this case, the surface to be marked is the hide of an animal. Markers of this sort often have paper sheaths that can be gradually peeled away as the marker erodes, revealing more of the marking substance beneath.

SUMMARY

A tool for marking livestock is a cylinder of marking material enveloped by a sheathing. The sheathing is segmented annularly at intervals along the vertical axis and each segment and is cut vertically so that it can be removed in sections to gradually reveal more of the marker. This leaves the rest of the marking material covered by the sheathing until it is needed for use. In some embodiments the sheath comprises an array of sheath-segments. Each sheath-segment is a hollow, cylindrical form with a vertical cut through its surface. The segments are stacked coaxially with the cylindrical marker. As the marker is abraded and becomes shorter, the sheath segments can be removed sequentially.

A solid section at the base of the marker is used for grasping and is referred to here as a "plug." In some embodiments the plug is of substantially similar diameter to a cylindrical marker and is fitted at the end of the cylindrical marker. In other words the plug resides end-to-end with the cylindrical marker. A segment of sheathing surrounds both the plug and a portion of the marker, thus holding them together during use. In other embodiments the plug is adhered to the bottom end of the marker and may be covered by a sheath that covers a portion of the marker and either fully or partially covers the plug, keeping the plug and marker joined until the marker is used up.

The sheathing may be constructed of paper, wood plastic or similar material, and preferably biodegradable.

BRIEF DESCRIPTION OF THE DRAWINGS

To assist those of skill in the art in making and using the disclosed invention and associated methods, reference is made to the accompanying figures, wherein.

DESCRIPTION

Figure 1:
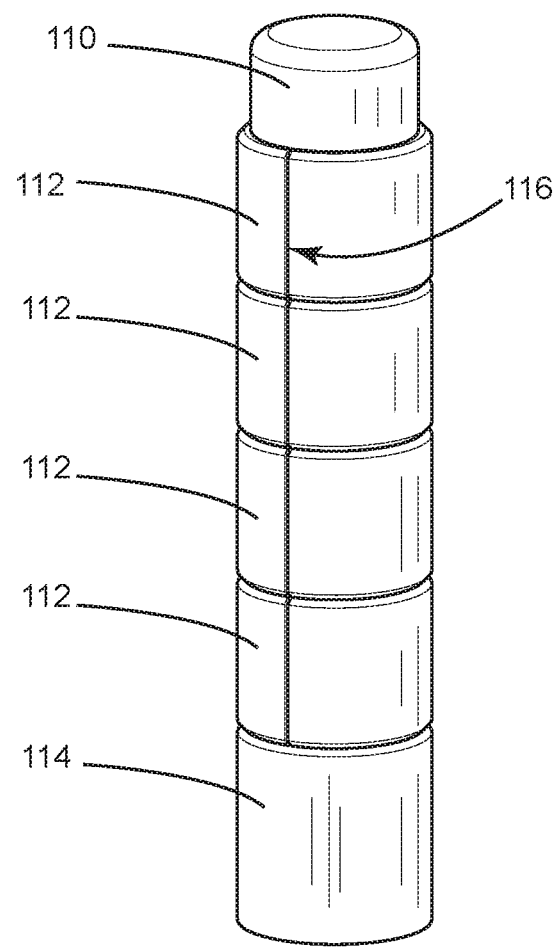
FIG. 1 is a perspective view of an example embodiment of the tool for marking livestock.

In FIG. 1, a perspective view of an example embodiment 100 shows a cylindrical volume of pigment 110 housed in a series of sheaths 112 that are split at a vertical cut 116. A bottom-most sheath 114 is relatively taller than each of the sheaths 112 in the series. As the cylindrical volume of pigment 110 is used and worn down, one of sheaths 112 of the series is flexed open and removed. One skilled in the art understands that sheaths 112 may be configured of a semi-rigid material that will remain in place on the cylindrical volume of pigment 110 in a location fit. Prying a sheath 112 open at the vertical split 116, flexing the sheath 112 sufficiently to be removed from the cylindrical volume of pigment 110 and removing the sheath 112 exposes a portion of the volume of pigment 110.

Figure 2:
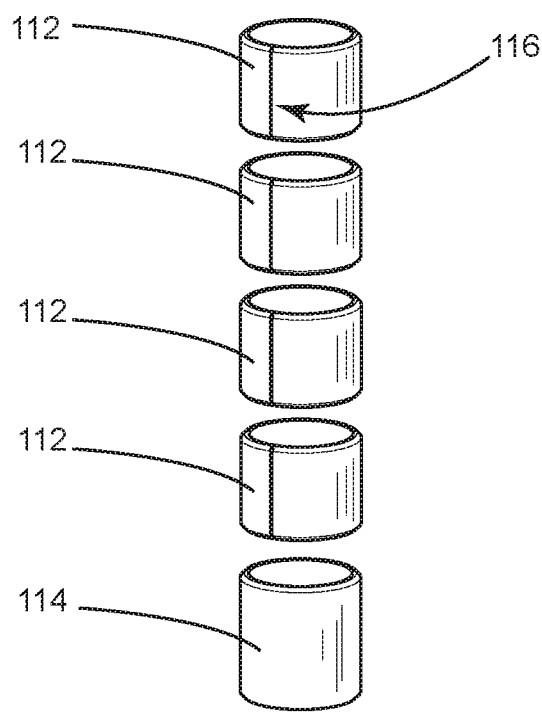
FIG. 2 is an exploded, perspective view of the embodiment of FIG. 1.
Figure 2:
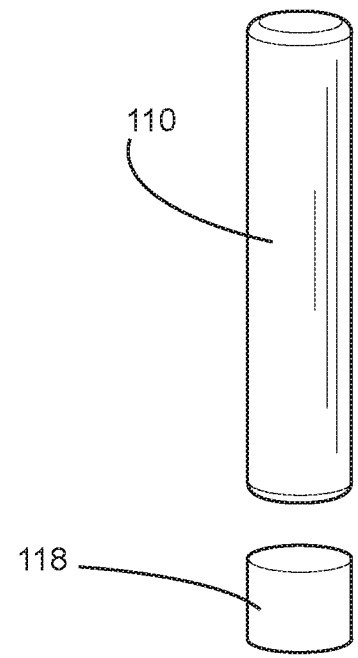

In FIG. 2 the embodiment 100 is illustrated in exploded view. Each of the series of sheaths 112 has a vertical split 116. A plug 118 at the bottom of the volume of pigment 110 is housed inside the relatively larger sheath 114. In some embodiments, the plug 118 is a disposable item. The plug 118 serves as an inexpensively constructed base section for grasping the tool for marking livestock when the marker is worn down below the last of the series of sheaths 112. One skilled in the art understands how a waste is reduced when most of the marker is constructed to be usable.

Figure 3:
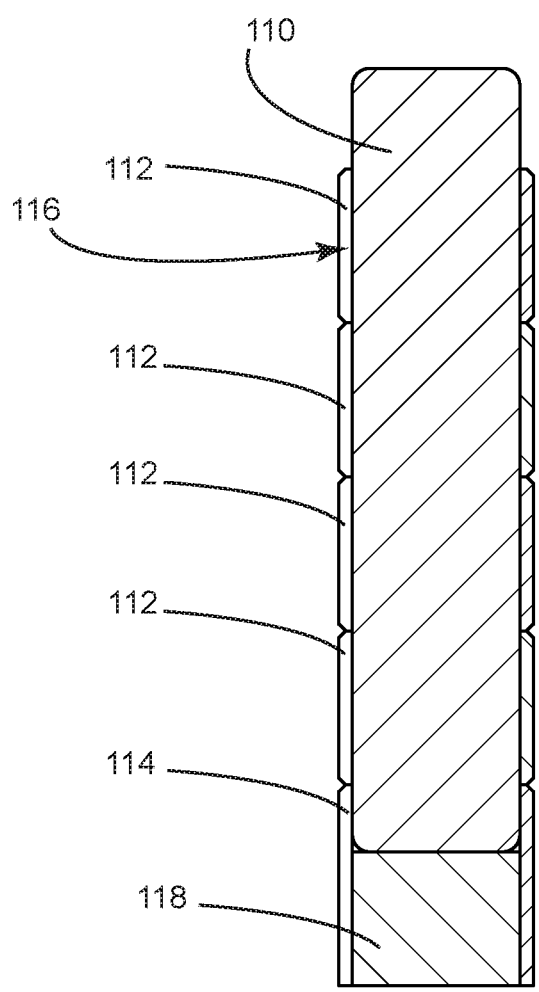
FIG. 3 is a section view of the embodiment of FIG. 1.
Figure 4:
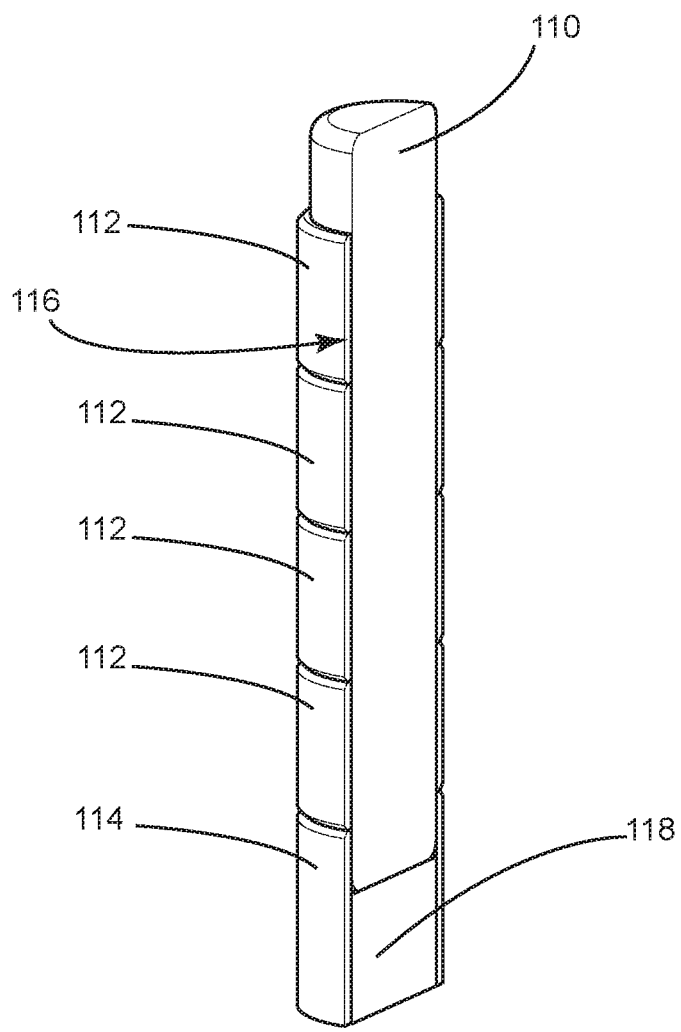
FIG. 4 is a perspective, section view of the embodiment of FIG. 1.

In FIGS. 3 and 4, a section view and perspective cross-sectional view, respectively, depict the assembled embodiment 100. The plug 118 is affixed to the bottom of the volume of pigment 110 and housed inside sheath 114. Most of the length of volume of pigment 110 is housed by the series of sheaths 112 which are each split at a vertical cut 116.

Figure 5:
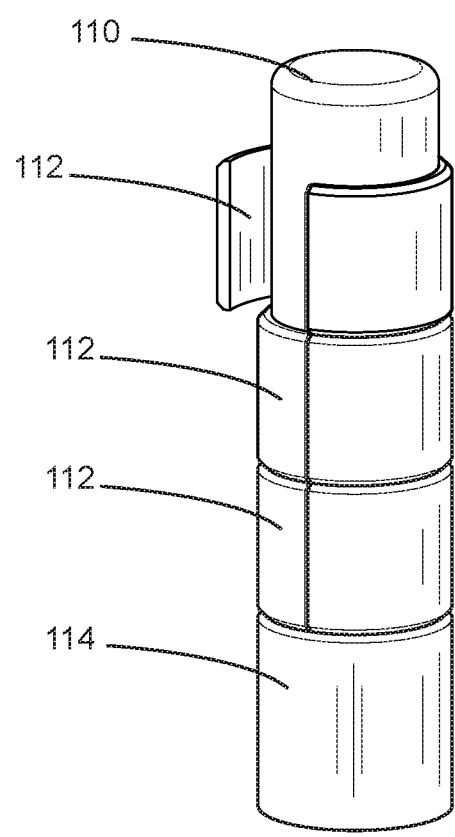
FIG. 5 is a perspective, section view of the embodiment of FIG. 1.

In FIG. 5, the volume of pigment 110 is shown worn down sufficiently to require that one of the sheaths 112 can be removed.

Figure 6:
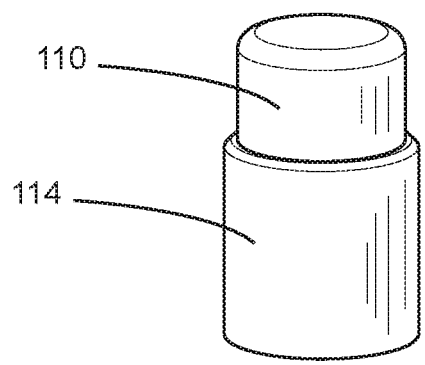
FIG. 6 is a perspective view of the base section or bottom-most sheath section.

In FIG. 6 most of the volume of pigment 110 has been used and is substantially worn down until the sheaths 112 (FIG. 5) have been removed. The housing 114 remains, surrounding the disposable plug 118 (FIG. 4) and the remainder of the volume of pigment 110.

Figure 7:
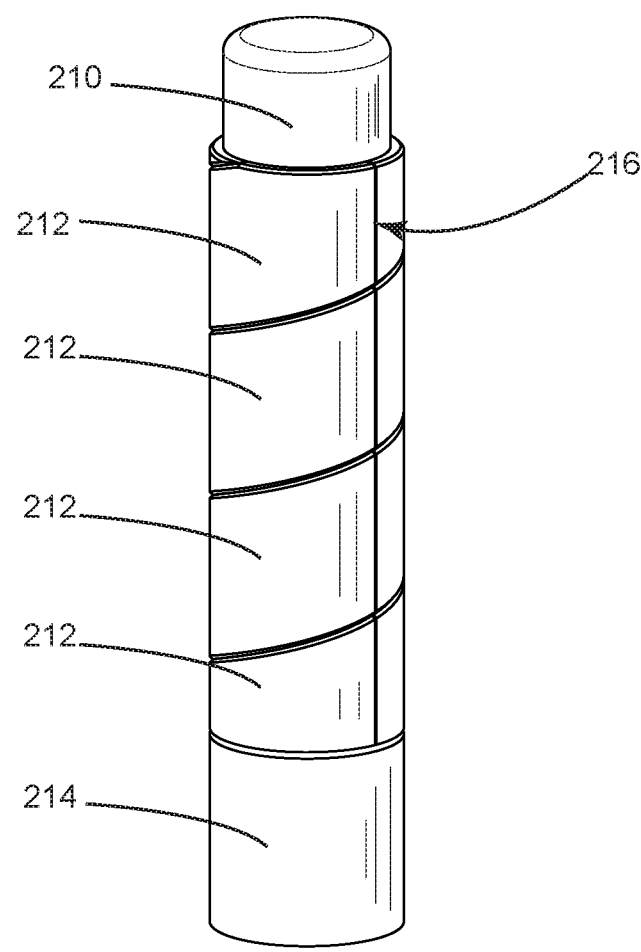
FIG. 7 is a front, perspective view of a second iteration.

FIG. 7 shows a second iteration 200 comprising a cylindrical volume of pigment 210, housed in a series of sheaths 212 that are split at a vertical cut 216. A bottom-most sheath 214 is relatively taller than each of the sheaths 212 in the series. As the volume of pigment 210 is used and worn down, one of sheaths 212 of the series is flexed open and removed. One skilled in the art understands that sheaths 212 may be configured of a semi-rigid material that will remain in place on the volume of pigment 210 in a location fit. Prying a sheath 212 open at the vertical split 216, flexing the sheath 212 sufficiently to be removed from the volume of pigment 210 and removing the sheath 212 exposes a portion of the volume of pigment 210.

One skilled in the art understands that the livestock marker is shown for reference and that the sheath is designed to be configured for markers of various proportions and sizes.

These embodiments should not be construed as limiting; additions and modifications to what is expressly described herein are understood to be included within the scope of the invention.

The invention claimed is:

1. A tool for marking livestock comprising:
a provided elongate cylindrical volume of pigment; and
a semi-rigid tube having an inside diameter equal to the outside diameter of the cylindrical volume of pigment, and
said semi-rigid tube having a vertical split; and
a cylindrical form having an outside diameter equal to the outside diameter of the cylindrical volume of pigment; and
said cylindrical form coaxial and engaged end-to-end with said cylindrical volume of pigment; wherein
the semi-rigid tube is a sheath for the cylindrical volume of pigment and is opened at the split and removed as the cylindrical volume of pigment is eroded, and the cylindrical form provides a handle for grasping a portion of the eroded cylindrical volume of pigment.

2. The tool for marking livestock of claim 1 wherein the cylindrical form is biodegradable.

3. The tool for marking livestock of claim 1 wherein the cylindrical form is a dense, multilayer paper cylinder.

4. The tool for marking livestock of claim 1 wherein the cylindrical form is plastic.

5. The tool for marking livestock of claim 1 wherein the cylindrical form is a reusable cork.

6. A tool for marking livestock comprising:
providing an elongate, cylindrical volume of pigment having a first end and a second end, the first end for marking livestock; and
the second end of said cylindrical volume of pigment engaged with a cylindrical form; and
at least a first and a second cylindrical sheath, each having an inner surface and an outer surface; and
said first cylindrical sheath having a vertical split and an inner surface removably engaged and coaxial with the cylindrical form for marking livestock; and
said second cylindrical sheath inner surface removably engaged, and coaxial with the cylindrical volume of pigment and further engaged with said cylindrical form;
wherein
as the cylindrical volume of pigment becomes shorter by being abraded; cylindrical split sheaths are removed by spreading the split and pulling said sheaths away from the cylindrical volume of pigment; the cylindrical form provides a graspable housing as cylindrical volume of pigment erodes.

7. A tool for marking livestock comprising:
providing an elongate, cylindrical volume of pigment having a first end and a second end, the first end for marking livestock; and
the second end of said cylindrical volume of pigment engaged with a cylindrical form; and
at least a first and a second helical sheath, each having an inner surface and an outer surface; and
said first helical sheath having a vertical split and an inner surface removably engaged and coaxial with the cylindrical form for marking livestock; and
said second helical sheath inner surface removably engaged, and coaxial with the cylindrical volume of pigment and further engaged with said cylindrical form;
wherein
as the cylindrical volume of pigment becomes shorter by being abraded; helical split sheaths are removed by spreading the split and pulling said helical sheaths away from the cylindrical volume of pigment; the cylindrical form in combination with the second helical sheath provides a graspable housing as cylindrical volume of pigment erodes.

* * * * *